(12) United States Patent
Fujinami et al.

(10) Patent No.: US 6,363,212 B1
(45) Date of Patent: Mar. 26, 2002

(54) APPARATUS AND METHOD FOR ENCODING AND DECODING DIGITAL VIDEO DATA

(75) Inventors: Yasushi Fujinami; Jun Yonemitsu; Makoto Kawamura; Yoichi Yagasaki, all of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/363,723

(22) Filed: Jul. 29, 1999

Related U.S. Application Data

(62) Division of application No. 08/690,807, filed on Aug. 1, 1996, now abandoned.

(30) Foreign Application Priority Data

Aug. 2, 1995 (JP) ............................................. 7-197813

(51) Int. Cl.⁷ ......................... H04N 5/928; H04N 5/781
(52) U.S. Cl. ........................ 386/104; 386/105; 386/112
(58) Field of Search ........................ 386/96, 102, 104, 386/105, 106, 109, 111, 112, 121, 124, 52, 95, 54, 39, 40, 8, 4, 98; H04N 5/928, 5/781

(56) References Cited

U.S. PATENT DOCUMENTS

| 5,122,886 A | * | 6/1992 | Tanaka | 386/96 |
| 5,802,245 A | * | 9/1998 | Kunihiro | 386/98 |

FOREIGN PATENT DOCUMENTS

| EP | 0 606 868 | 7/1994 |
| EP | 0 651 391 | 5/1995 |
| EP | 0 676 756 | 10/1995 |
| WO | WO94 07332 | 3/1994 |

OTHER PUBLICATIONS

Patent Abstracts of Japan, vol. 018, No. 685, Dec. 22, 1994 & JP06–267196, Sep. 22, 1994.

* cited by examiner

Primary Examiner—Robert Chevalier
(74) Attorney, Agent, or Firm—Frommer Lawrence & Haug LLP; William S. Frommer; Bruno Polito

(57) ABSTRACT

Digital video data encoder and decoder operate to enable the low and high speed reproduction of variable rate encoded digital video data by reproducing and decoding intraframe encoded frames that are identified by previously reproduced intraframe encoded frames. In the encoder, digital video data is variable rate encoded, for example, intraframe and interframe encoded, entry points (i.e., beginning positions) of selected encoded video data are identified and which represent video frames that occur at predetermined intervals of time (e.g., 1, 2 and 4 seconds) in the video picture. Entry point data that identify these positions are generated and added to the encoded video data before the video data is recorded on a record medium. When the encoded data is reproduced from the record medium, the entry point data is extracted therefrom and stored, and a successive intraframe encoded frame identified by the extracted entry point data is reproduced and decoded. The invention further provides for a record medium having thereon the encoded digital video data, and also provides for an encoder and corresponding decoder which encode and decode, respectively, digital still image and audio data in which entry points refer to each of the still images and also to particular intervals of time of the audio data.

12 Claims, 13 Drawing Sheets

| PACKET START CODE PREFIX | ID | LENGTH | *** ID | ** PACKET TYPE | CURRENT# DATA STREAMS | CURRENT# VIDEO STREAMS | CURRENT# Audio STREAMS | -3 | -2 | -1 | +1 | +2 | +3 |

FIG.3

| Syntax | No. of bits | Mnemonic |
|---|---|---|
| directory_PES_packet() { | | |
|     packet_start_code_prefix | 24 | bslbf |
|     directory_stream_id | 8 | uimsbf |
|     PES_packet_length | 16 | uimsbf |
|     number_of_access_units | 15 | uimsbf |
|     marker_bit | 1 | bslbf |
|     prev_directory_offset[44..30] | 15 | uimsbf |
|     marker_bit | 1 | bslbf |
|     prev_directory_offset[29..15] | 15 | uimsbf |
|     marker_bit | 1 | bslbf |
|     prev_directory_offset[14..0] | 15 | uimsbf |
|     marker_bit | 1 | bslbf |
|     next_directory_offset[44..30] | 15 | uimsbf |
|     marker_bit | 1 | bslbf |
|     next_directory_offset[29..15] | 15 | uimsbf |
|     marker_bit | 1 | bslbf |
|     next_directory_offset[14..0] | 15 | uimsbf |
|     marker_bit | 1 | bslbf |
|     for(i=0; i<number_of_access_units;i++) { | | |
|         packet_stream_id | 8 | uimsbf |
|         PES_header_position_offset_sign | 1 | tcimsbf |
|         PES_header_position_offset[43..30] | 14 | uimsbf |
|         marker_bit | 1 | bslbf |
|         PES_header_position_offset[29..15] | 15 | uimsbf |
|         marker_bit | 1 | bslbf |
|         PES_header_position_offset[14..0] | 15 | uimsbf |
|         marker_bit | 1 | bslbf |
|         reference_offset | 16 | uimsbf |
|         marker_bit | 1 | bslbf |
|         reserved | 3 | bslbf |
|         PTS[32..30] | 3 | uimsbf |
|         marker_bit | 1 | bslbf |
|         PTS[29..15] | 15 | uimsbf |
|         marker_bit | 1 | bslbf |
|         PTS[14..0] | 15 | uimsbf |
|         marker_bit | 1 | bslbf |
|         bytes_to_read[22..8] | 15 | uimsbf |
|         marker_bit | 1 | bslbf |
|         bytes_to_read[7..0] | 8 | uimsbf |
|         marker_bit | 1 | bslbf |
|         intra_coded_indicator | 1 | bslbf |
|         coding_parameters_indicator | 2 | bslbf |
|         reserved | 4 | bslbf |
|     } | | |
| } | | |

FIG.7

| Syntax | No. of Bits | Mnemonic |
|---|---|---|
| program_stream_map(){ | | |
|     packet_start_code_prefix | 24 | bslbf |
|     map_stream_id | 8 | uimsbf |
|     program_stream_map_length | 16 | uimsbf |
|     current_next_indicator | 1 | bslbf |
|     reserved | 2 | bslbf |
|     program_stream_map_version | 5 | uimsbf |
|     reserved | 7 | bslbf |
|     marker_bit | 1 | bslbf |
|     program_stream_info_length | 16 | uimsbf |
|     for (i=0;i<N;i++){ | | |
|         descriptor() | | |
|     } | | |
|     elementary_stream_map_length | 16 | uimsbf |
|     for (i=0;i<N1;i++){ | | |
|         stream_type | 8 | uimsbf |
|         elementary_stream_id | 8 | uimsbf |
|         elementary_stream_info_length | 16 | uimsbf |
|         for (i=0;i<N2;i++){ | | |
|             descriptor() | | |
|         } | | |
|     } | | |
|     CRC_32 | 32 | rpchof |
| } | | |

(B: program_stream_info_length through closing brace of first for-loop; C: elementary_stream block)

FIG.8

APPARATUS AND METHOD FOR ENCODING AND DECODING DIGITAL VIDEO DATA

This application is a Div of Ser. No. 08/690,807 filed Aug. 1, 1996 now abandoned.

BACKGROUND OF THE INVENTION

The present invention relates to apparatus and method for encoding and decoding digital video data and, more particularly, to apparatus and method for encoding and decoding digital video data which enable low and high-speed reproduction of variable rate encoded digital video data, and also to a record medium having stored thereon variable rate encoded digital video data in a particular data structure which enables the low and high-speed reproduction thereof.

As is known, MPEG compressed digital video data includes intraframe encoded digital video data ("I-frames") and interframe encoded digital video data including forward predictive encoded data ("P-frames") and bi-directionally predictive encoded data ("B-frames"). Generally, an I-frame is decoded without using data of other frames, but P and B-frames are decoded utilizing other frames.

A bit stream of MPEG compressed digital video data generally is divided into groups of pictures (GOPs), and each GOP begins with an I-frame. When digital video data is MPEG compressed at a fixed rate, for example, when the frame pattern of the GOP is fixed, I-frames periodically occur in the bit stream at known positions thereof and, thus, high speed reproduction of the video data by reproducing only I-frames therein is possible since the general position of each I-frame is known. However, when digital video data is MPEG compressed at a variable rate (e.g., the frame pattern of a GOP is variable) I-frames do not occur in the bit stream at known intervals thereof and, thus, high speed reproduction by reproducing only I-frames is difficult.

One technique for accomplishing higher than normal speed reproduction of MPEG compressed digital video data is to record in each sector that includes an I-frame at the beginning of a GOP therein a flag which indicates the existence of the I-frame, and to record in that sector the sector addresses (i.e., positions) of adjacent sectors that include I-frames therein. Therefore, a relatively slow search speed can be accomplished by reproducing adjacent I-pictures in the bit stream.

One problem with the above-discussed technique is its general inability to reproduce video data from a record medium in high-speed searching modes wherein it is desirable to successively reproduce I-frames occurring at relatively high intervals of time, for example, every 1, 2, 4, etc. seconds, in the bit stream.

OBJECTS OF THE INVENTION

Therefore, it is an object of the present invention to provide apparatus and method for encoding and decoding digital video data which overcome the shortcomings of the above-discussed reproducing technique.

Another object of the present invention is to provide apparatus and method for encoding and decoding digital video data which is operable to achieve low and high speed reproduction of compressed digital video data.

A further object of the present invention is to provide a recording and reproducing technique which operate to achieve both high and low speed reproduction of variable rate compressed digital video data.

An additional object of this invention is to provide a technique which allows for the reproduction of I-frames temporally occurring at predetermined constant intervals of time.

Still another object of the present invention is to provide a record medium having compressed digital video data stored thereon which is reproducible at low and high search speeds.

A still further object of this invention is to provide for the low and high speed reproduction of compressed digital still image and audio data.

SUMMARY OF THE INVENTION

In accordance with one embodiment of the present invention, apparatus and method operate to variable rate encode digital video data (i.e., intraframe and interframe encode), identify a selected plurality of entry points of the encoded video data which represent respective locations of video frames that occur at predetermined intervals of time (e.g. 1, 2 and 4 seconds) in the video picture, generate entry point data that identifies the positions of the entry points, add the entry point data to the encoded video data, and record the encoded video data having the entry point data added thereto on a record medium.

As one aspect of the present invention, the entry point data identifies entry points of intraframe encoded frames that occur at the predetermined intervals of time in the video picture.

As a feature of this aspect, the entry point data identifies an entry point of the intraframe encoded frame that is located nearest in time to the frame that occurs at one of the predetermined time intervals when that frame is not an intraframe encoded frame.

As another aspect of this invention, respective entry point data is added to each intraframe encoded frame that identifies entry points of intraframe encoded frames that occur at predetermined intervals of time before and after the intraframe encoded frame to which the respective entry point data is added.

In accordance with another embodiment of the present invention, apparatus and method operate to reproduce from a record medium variable rate encoded digital video data which represents a plurality of successive video frames and which includes therein entry point data that identifies positions of locations of video frames that occur at predetermined intervals of time in the video picture, extract the entry point data from the reproduced data, store the extracted entry point data in a memory, control the reproduction of the encoded data in accordance with entry point data that is stored in the memory so as to reproduce a particular video frame, and variable rate decode the reproduced data to produce decoded video data.

As one aspect of this embodiment, the reproduced data includes intraframe and interframe encoded frames and each reproduced intraframe encoded frame includes respective entry point data that identifies entry points of intraframe encoded frames that occur at the predetermined intervals of time from the intraframe encoded frame to which the respective entry point data is included. After the reproduction of one intraframe encoded frame, one of the intraframe encoded frames that is identified by the entry point data included in the reproduced intraframe encoded frame then is reproduced.

In accordance with a further embodiment of the present invention, a record medium comprises a plurality of variable length video data areas in which variable encoded digital video data is stored, wherein the encoded digital video data includes a plurality of intraframe and interframe encoded frames each of which is stored in a respective one of the video data areas, and a plurality of entry point data areas in which entry point data are stored, wherein the entry point data identifies positions of entry points of the encoded digital video data which represent respective locations of video data areas in which intraframe encoded frames that occur at predetermined intervals of time in the video picture are stored.

In accordance with yet another embodiment of the present invention, apparatus and method operate to variable rate encode digital still image and audio data, identify entry points that represent locations of the still images in the encoded data, generate entry point data that identifies positions of the identified entry points in the encoded data, add the entry point data to the encoded data, and record the encoded data having the entry point data added thereto on a record medium.

In accordance with yet a further embodiment of the present invention, apparatus and method operate to reproduce from a record medium variable rate encoded digital still image data that includes therein entry point data that identifies positions of entry points of the encoded data which represent respective locations of still images in the encoded data, extract the entry point data from the reproduced encoded data, store the extracted entry point data in a memory, control the reproduction of the encoded data in accordance with entry point data stored in the memory to reproduce an encoded still image, and variable rate decode the reproduced encoded still image to produce a decoded still image.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 3 illustrates the data structure of an entry packet in accordance with the present invention;

FIG. 7 is a table of the program stream directory of an entry sector;

FIG. 8 is a table of the program stream map of an entry sector;

DETAILED DESCRIPTION OF CERTAIN PREFERRED EMBODIMENTS

Figure 1:
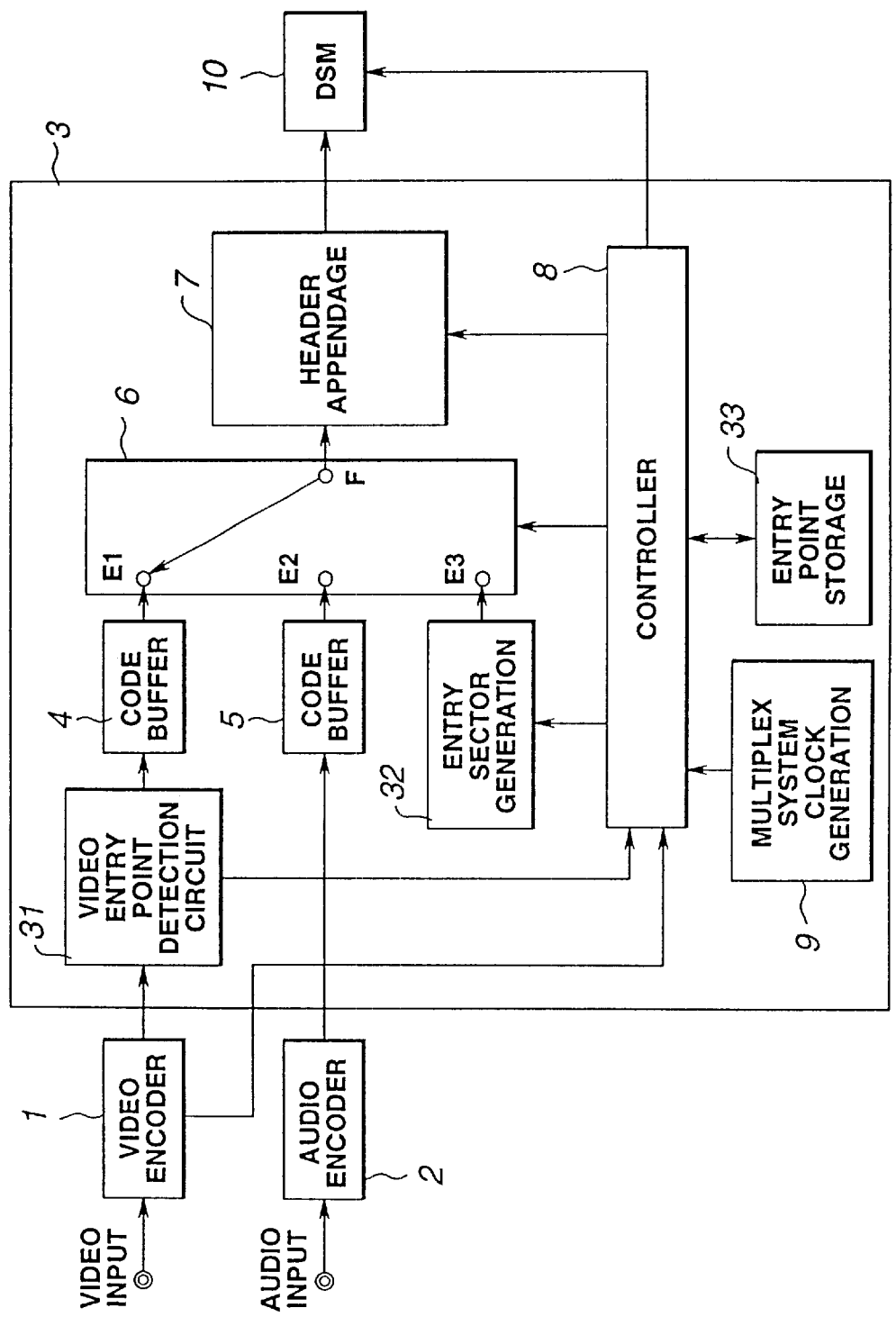
FIG. 1 is a block diagram of apparatus for encoding digital video data in accordance with the present invention.

Referring to the drawings, and particularly to FIG. 1 thereof, a block diagram of apparatus for encoding digital video data (hereinafter encoding apparatus) in accordance with the present invention is shown. The encoding apparatus is shown as comprising a video encoder 1, an audio encoder 2, a multiplexing circuit 3 and a digital storage memory (DSM) 10. A digital video signal supplied to a video input terminal is supplied to video encoder 1 which compression encodes (i.e., intraframe and interframe encodes) the video signal in a manner well known in the art and which supplies the encoded video data to a video entry point detection circuit included in multiplexer 3. An digital audio signal supplied to an audio input terminal is supplied to audio encoder 2 which encodes the audio data therein in a manner well known in the art to produce packets of audio data and which supplies the packets of audio data to a code buffer 5 included in multiplexer 3.

In accordance with the present invention, video encoder supplies to a controller 8 an entry point ID signal at each output from the video encoder of an I-frame (intracoded frame) of video data.

Multiplexer 3 is comprised of code buffers 4 and 5, a switching circuit 6, a header appending circuit 7, controller 8, a multiplex system clock generator 9, video entry point detection circuit 31 (hereinafter entry point detector 31), an entry sector generating circuit 32 and an entry point storage memory 33. Entry point detector 31 detects the occurrence of an I-frame in the bit stream supplied thereto and supplies to controller 8 another entry point ID signal which indicates the occurrence of an I-frame. Although the entry point ID signals supplied to controller 8 from both video encoder 1 and entry point detector 31 are redundant signals, under certain circumstances, video encoder 1 will not generate the entry point ID signal, for example, as when pre-encoded video data is supplied thereto. Alternatively, video encoder 1 does not supplies the entry point ID signal to control 8. In either case, the occurrence of each I-frame in the bit stream output from entry point detector 31 and which is supplied to code buffer 4 is known.

Code buffer 4 stores the bit stream data supplied thereto and outputs the stored data to a terminal E1 of switch 6. Similarly, code buffer 5 stores the packets of audio data therein and supplies the stored audio data to a terminal E2 of switch 6. Controller 8 functions to control switch 6 to switch between terminals E1 and E2 so as to time-divisionally multiplex packets of video and audio data. In addition, and in response to the occurrence of an I-frame as indicated by an entry point ID signal from either circuit 1 or 31, controller 8 controls entry sector generating circuit 32 to generate entry packet data (to be discussed) and controls switch 6 to switch to terminal E3 so as to effectively insert the generated entry packet data in the bit stream immediately prior to the I-frame. System clock generator 9 generates a system clock signal which is supplied to controller 8 which utilizes the supplied signal for purposes of controlling switch 6 to switch between its input terminals E1–E3.

Switch 6 supplies the time-divisionally multiplex data to header appending circuit 7 which, in response to a control signal from controller 8, adds a video packet header to the beginning of each packet of video data, adds an audio packet header to the beginning of each packet of audio data, and adds a pack header to each data pack. Header appending circuit 7 further appends a back header to each data pack so that each data pack is 2048 bytes long and supplies the resultant signal to digital storage memory DSM which stores the digital data therein.

Entry point storage memory 33 stores therein position data relating to the detected entry points, that is, positions of selected I-frames output from code buffer 4. Entry point storage memory 33 is further discussed below.

Figure 2:
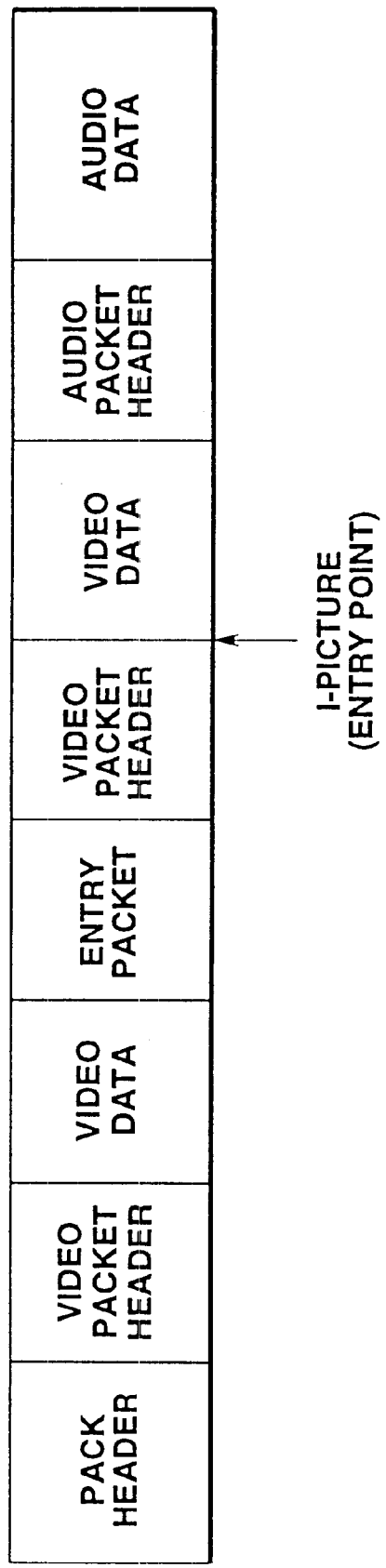
FIG. 2 illustrates the data structure of a data pack according to the present invention.

FIG. 2 illustrates the data structure of a data pack stored in DSM 10. As shown, the data pack includes a pack header followed by a video packet header, video data, an entry packet, another video packet header, video data, an audio packet header and audio data. The pack header includes various information including a pack start code, SCR data, multiplexing rate data, etc. The first video packet header and video data immediately following the pack header represent a packet of video data that does not include an I-frame therein since an entry packet has not been inserted before the first video packet header. However, an entry packet (also called entry data-packet herein) precedes the next video packet header and, thus, the ensuing video data includes an I-frame.

The data structure of an entry packet is shown in FIG. 3. The entry packet includes a packet start code prefix followed by the stream ID data of 0xbf (hexadecimal), length data which identifies the length (i.e., data amount) of the successive packet, "**" ID data (default is FFh) which indicates that the entry packet is specific for a particular person, "**" packet type which indicates the type of classification if the entry packet is specific for a particular person, "current# data streams" data which identifies the number of data sectors that occur before the next entry sector, "current# video streams" data which identifies the number of video sectors that occur before the next entry sector, and "current# audio streams" data which identifies the number of audio sectors that occur before the next entry sector.

Figure 4:
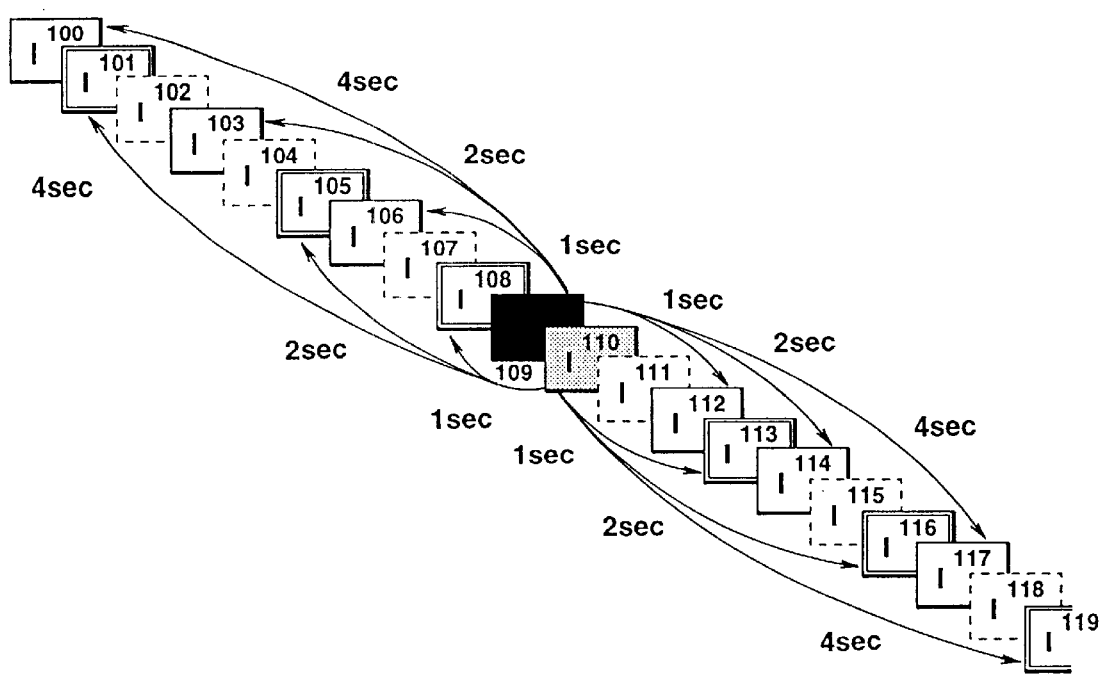
FIG. 4 is a schematic illustration of the location of I-frames and selected entry points thereof in the data stream temporally occurring at various intervals of time.

The entry packet further includes "−3", "−2", "−1", "+1", "+2" and "+3" entry packet data which identify the locations of 6 different "entry points" corresponding to the beginning positions of 6 different I-frames in the data stream. Referring to FIG. 4, a schematic illustration of successive I-frames in the encoded bit stream is shown (the P-frames and B-frames are not shown for convenience) wherein the entry packet stored with (i.e., immediately prior to) each I-frame identifies the locations of 6 different I-frames. In accordance with the present invention, the "−3", "−2" and "−1" entry packet data identify the beginning locations of 3 I-frames that occur at 3 different predetermined intervals of time prior to the I-frame in which the entry packet is stored. In addition, the "+1", "+2" and "+3" entry packet data identify the beginning locations of 3 I-frames that occur at the 3 different predetermined intervals of time after the I-frame in which the entry packet is stored. If the 3 different predetermined intervals of time are, for example, 1 second, 2 seconds and 4 seconds, respectively, then the entry packet stored with I-frame 109 identifies the relative locations (relative to I-frame 109) of I-frames 100, 103, 106, 112, 114 and 117, as shown in FIG. 4. As seen, frame 100 occurs 4 seconds before I-frame 109, frame 103 occurs 2 seconds before I-frame 109, frame 106 occurs 1 second before I-frame 109, I-frame 112 occurs 1 second after I-frame 109, I-frame 114 occurs 2 seconds after I-frame 109, and I-frame 117 occurs 4 seconds after I-frame 109. Similarly, the entry packet stored with I-frame 110 identify I-frames 108, 105 and 101 which occur 1, 2 and 4 seconds, respectively, before I-frame 110, and also identify I-frames 113, 116 and 119 which occur 1, 2 and 4 seconds, respectively, after I-frame 110. Each of the entry packet data "−3", "−2", . . . , "+3" identifies the number of sectors between the current I-frame and the entry point (see FIG. 2) of the respective identified I-frame. The predetermined different intervals of time may be different from that shown in FIG. 4. For example, the intervals of time of 1, 3 and 9 seconds may be used. Further, the intervals of time may be varied depending on various properties of the video picture and may vary within the video picture itself. For example, time intervals may be relatively short for a group of images in which the motion therein is large and may be relatively large for a group of images if the motion therein is small.

It is seen that by identifying entry points representing I-frames located at 3 different intervals of time from a given I-frame (both before and after), both low-speed searching and high-speed searching (and mid-speed searching) can be accomplished, as will be discussed. In addition, as the reproducing speed exponentially increases, for example, from a 10× to a 100× reproducing speed, it is preferable to use entry points (i.e., I-frames) that are located at exponentially increasing temporal distances from a given I-frame. For example, in a 100× reproducing mode, a predetermined time interval of approximately 4 seconds is chosen. At a 30 frame/second frame rate, there are 120 frames in 4 seconds, which is close enough to the desired 100× reproducing speed. However, a 3.3 second time interval can be used if greater precision is required. On the other hand, for very low reproducing search speeds, for example, in a 2× reproducing mode, sequential decoding of I-frames should suffice and, thus, use of entry points may not be necessary.

Referring back to FIG. 1, an entry sector (i.e., entry packet), which includes the data shown in FIG. 3, is generated by entry sector generator 32 in response to the occurrence of an I-frame (i.e., current I-frame), as previously discussed. At the time the entry packet is generated, the entry packet data −3, −2 and −1 can be generated since the positions of I-frames that precede the current frame are known (i.e., they have already occurred in the bit stream). Entry point storage memory 33 stores the absolute positions of each entry point (i.e., the beginning of each I-frame) in the bit stream, and entry sector generator 32 is operable to generate relative position data identifying the 3 I-frames that occur before the current frame by using the absolute position of those I-frames stored in memory 33 and the known position of the current frame.

However, the position of entry points corresponding to the beginning locations of I-frames that occur after the current frame are not known at the time the current frame is supplied to switch 6 (i.e., when it occurs in the bit stream). Thus, dummy data is established as entry packet data +1, +2 and +3 in entry sector generator 32 and the bit stream including the video and audio data and each of the entry packets (having the dummy data therein) is stored in DSM 10. At the end of the bit stream (i.e., after all of the video, audio and entry packets are stored in DSM 10), controller 8 ascertains the values of entry packet data +1, +2 and +3 for every one of the entry packets using the positions of each of the entry points (i.e., I-frames) stored in memory 33, and stores the entry packet data +1, +2 and +3 of every entry packet in the appropriate location of DSM 10.

As previously mentioned, the digital video data may be variable-bit encoded (e.g., the frame pattern of a GOP is variable). In this case, an I-frame may not occur at constant intervals in the bit stream and, thus, if a desired interval of time is, for example, 1 second, the encoding apparatus of the present invention cannot assume that the same number of frames (I, P and B-frames) occur between I-frames that are approximately 1 second apart from one another. It is therefore necessary to ensure that each I-frame to which entry packet data of a current frame refers is as closest to the desired time interval as possible.

Figure 5:
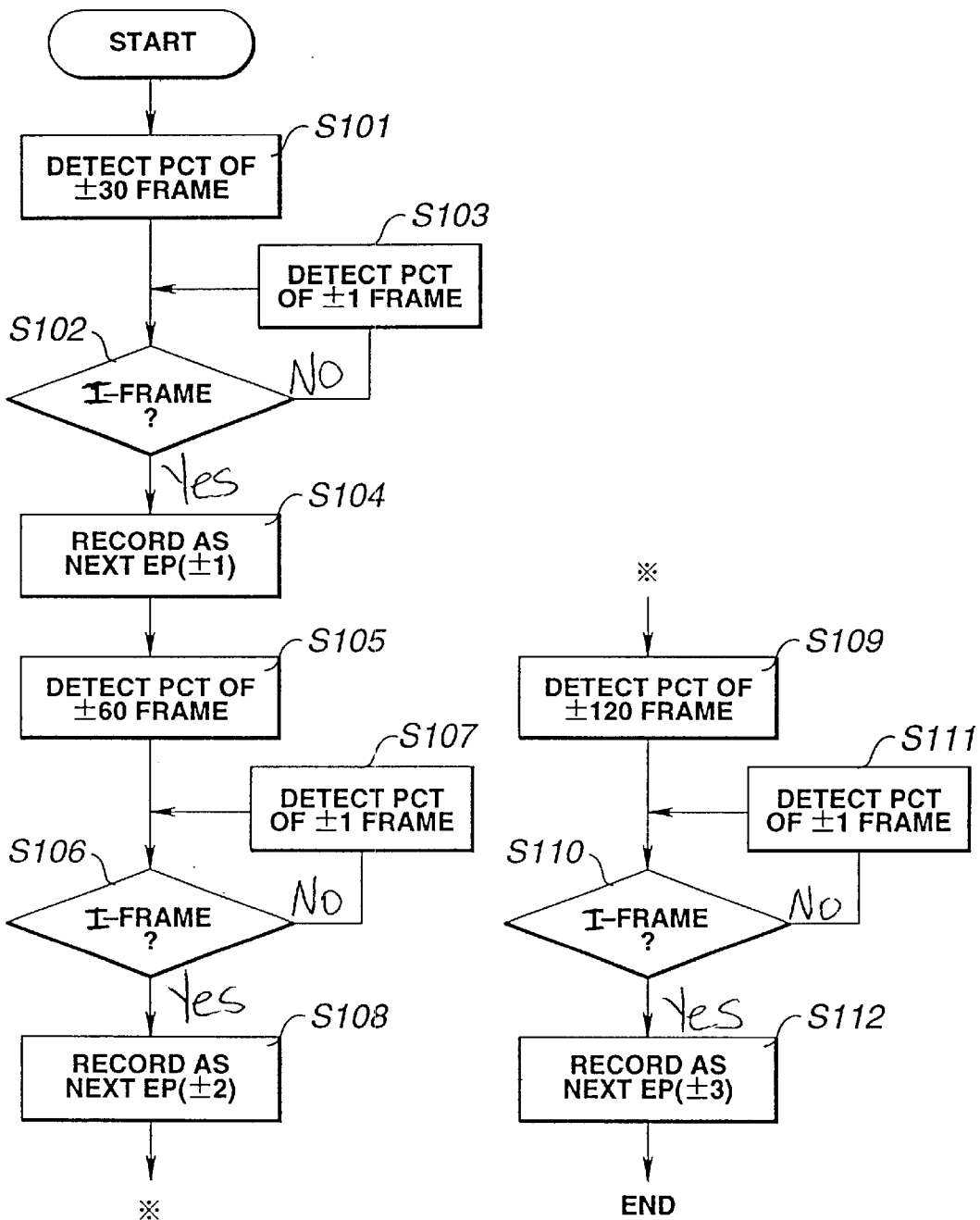
FIG. 5 is a flowchart for detecting and recording the position of selected identified frames in accordance with the present invention.

FIG. 5 is a flowchart of an operation of controller 8 for identifying the appropriate I-frame to which each entry packet data refers in accordance with the present invention. It is noted that controller 8 operates to execute the flowchart of FIG. 5 twice, once when the bit stream is being output from video encoder 1 and subsequently stored in DSM 10 to ascertain the positions of the entry points of I-frames that precede the current frame, and a second time after the bit stream is fully stored in DSM 10 so as to ascertain the positions of the entry points of I-frames that follow each current frame.

A description of the first time execution of the flowchart of FIG. 5 will be provided. At the occurrence of an I-frame (i.e., current frame), the position (PCT) of a selected frame that precedes the current frame by 30 frames, which corresponds to a frame that occurs 1 second before the current frame, is ascertained at instruction S101. Since entry points should refer only to I-frames, inquiry S102 determines whether the selected frame is an I-frame. If the selected frame is an I-frame, the beginning position (i.e., the entry point) of the selected frame relative to the current frame is stored as the entry packet data −1 of the entry packet that is stored with (i.e., immediately preceding) the current frame at instruction S104. However, if the selected frame is not an I-frame, the position of a frame that is adjacent to (either before or after) the selected frame in the bit stream is selected as the new selected frame at instruction S103, and then it is determined if the new selected frame is an I-frame at inquiry S102. The result of steps of S102 and S103 is a selection of an I-frame that is closest in time to the desired 1 second time interval from the current frame.

Next, the position (PCT) of a selected second frame that precedes the current frame by 60 frames, which corresponds to a frame that occurs 2 seconds before the current frame, is ascertained at instruction S105. Similar to inquiry S102 and instruction S103, inquiry S106 determines whether the selected second frame is an I-frame, and the position of a frame that is adjacent to the selected second frame in the bit stream is selected as the new selected second frame at instruction S107. When the selected second frame is an I-frame, the beginning position of the selected second frame relative to the current frame is stored as the entry packet data −2 of the entry packet of the current frame at instruction S108.

Steps 109 through 112 operate in a similar fashion to both sets of steps S101 to S104 and steps S105 to S108, except that an I-frame that precedes the current frame by 120 frames initially is selected, which corresponds to a frame that occurs approximately 4 seconds before the current frame. The beginning position of the selected third frame relative to the current frame then is stored as the entry packet data −3 of the entry packet of the current frame at instruction S112.

The operation of the flowchart of FIG. 5 is repeated after the entire bit stream is stored in DSM 10 to ascertain the positions of the entry points of I-frames that occur after the current frames.

Although the flowchart of FIG. 5 provides for the re-selecting of a frame, in inquiries S103, S107 and S111, if an I-frame has not yet been selected, the present invention contemplates that the ultimate selection of an I-frame that occurs at a time interval from a current frame that is considerably different from a desired time interval may be undesirable. Therefore, in one embodiment of the present invention, I-frames that occur before or after the current I-frame by an amount of time that is different from the desired time interval by more than 10% are not referred to by the entry point data of the current I-frame. For example, for the desired time intervals of 1, 3 and 9 seconds, I-frames that occur at times less than 900 milliseconds (ms), 2700 ms and 9000 ms from the current I-frame are not referred to in entry packet data of the current frame.

If the next entry point is the first I-picture of a GOP, the beginning of the GOP is detected by the group start code included in the GOP. An I-frame which appears first becomes the next entry point.

Figure 6:
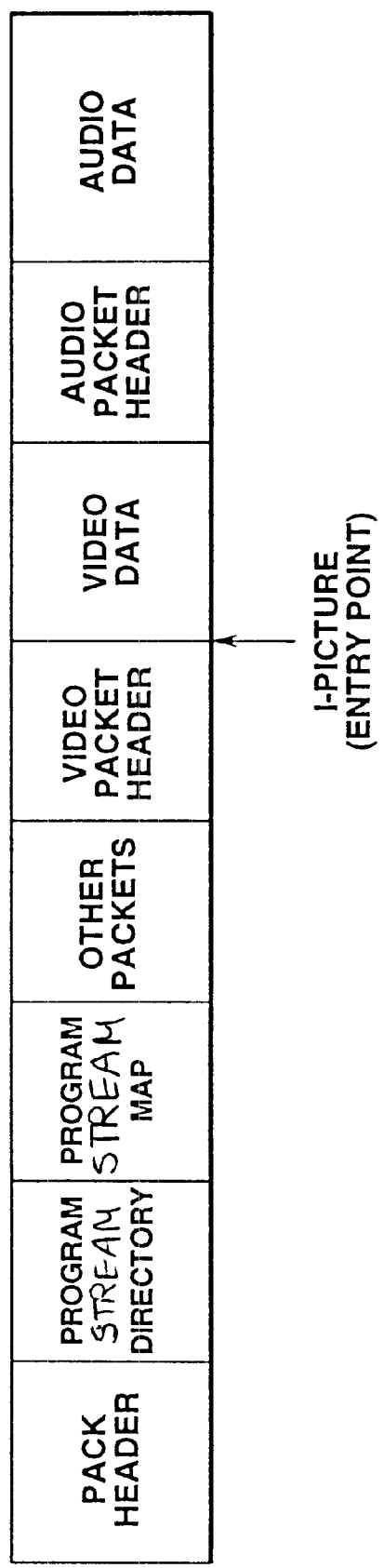
FIG. 6 illustrates another data structure of a data pack according to the present invention.

FIG. 6 illustrates the data structure of the entry sector, that is, a data pack in which an I-frame is included, in accordance with another embodiment of the present invention. As shown, the entry sector includes a pack header which includes therein a pack start code, SCR data and MUX rate data. The pack header is followed by a program stream directory, a program stream map, a pack other than a video pack, a video packet header, video data including an I-frame, an audio packet header, and audio data. In this embodiment, the data occurs in a pre-set sequence from the beginning of the sector, thus facilitating data handling.

The program stream directory has a data structure defined by the MPEG standard and is used to specify an accessible position in the data stream. The program stream directory is shown in FIG. 7. A loop "A" in the stream is traversed seven times to record three "forward" and three "backward" I-frames as well as the entry points to the "backward" I-frames. "Forward" and "backward" I-frames herein refer to the I-frames that are identified in the data pack of a current frame. The program stream map is shown in FIG. 8 and, as shown, loops B and C therein include descriptors "( )" for accommodating a variety of information data. Information data are included in the descriptors, for example, the number of streams or the information on elementary streams.

Figure 9:
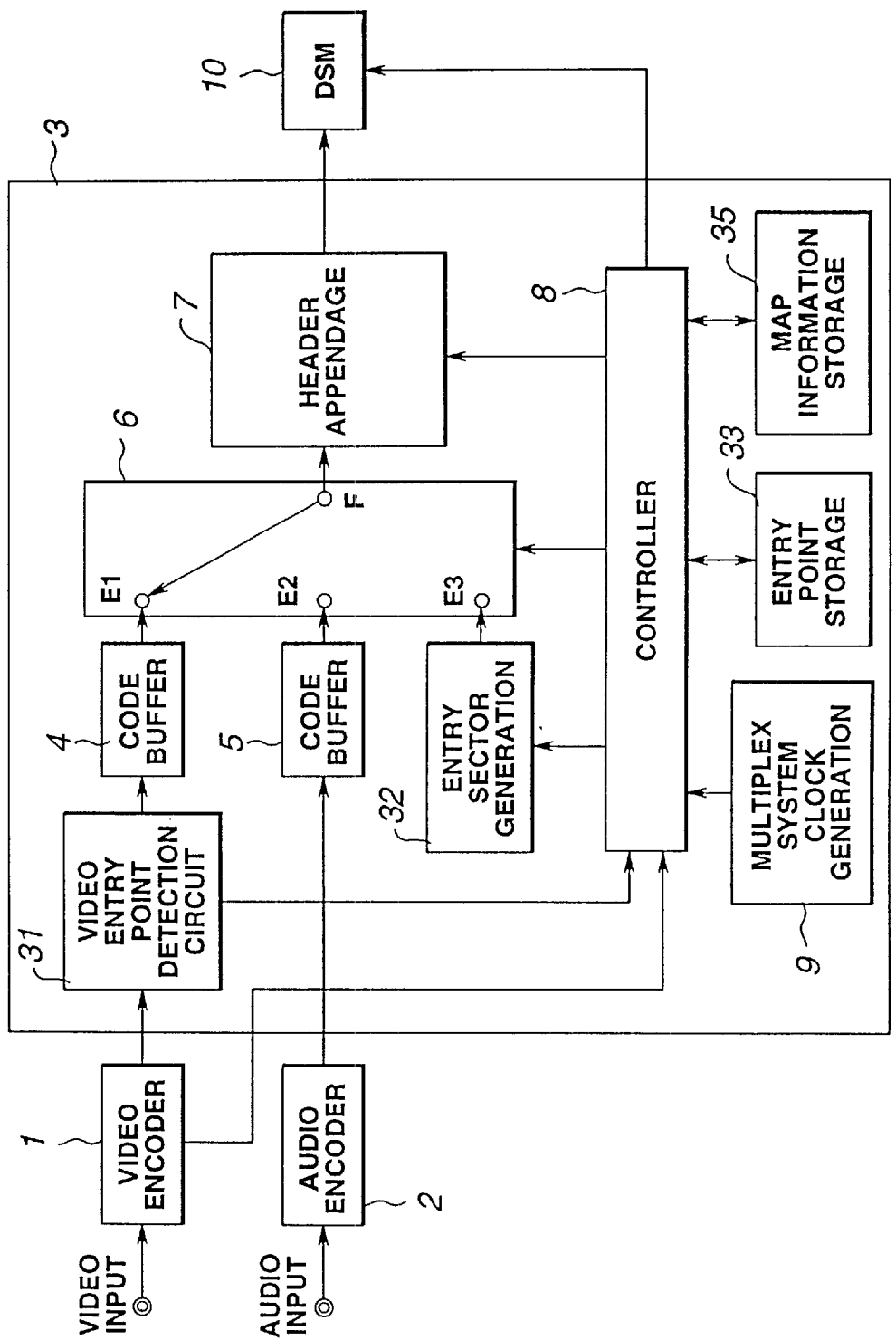
FIG. 9 is a block diagram of apparatus for encoding digital video data in accordance with another embodiment of the present invention.

FIG. 9 is a block diagram of apparatus for encoding digital video data in accordance with another embodiment of the present invention, wherein a map information storage device 35 is included in multiplexer 3 which receives information from an external entry device (not shown). All elements of the apparatus of FIG. 9, except device 35, are included in the encoding apparatus of FIG. 1 and, therefore, description thereof is omitted herein. Information stored in device 35 is read therefrom and stored as an entry sector each time it constitutes an entry sector. If the information utilizes a future entry sector position, the entry sector position is read from device 33 after the entire bit stream is stored in DSM 10.

Figure 10:
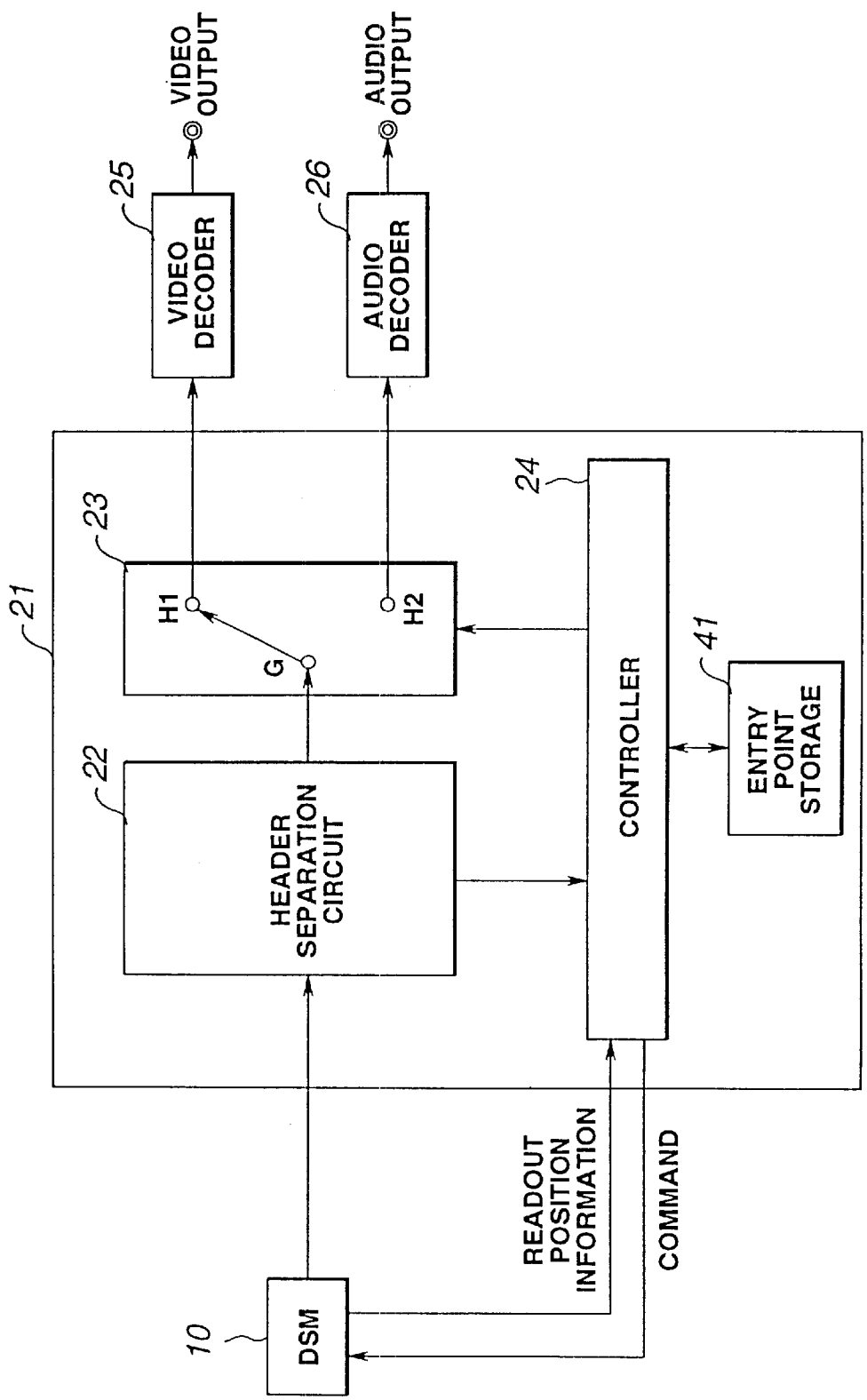
FIG. 10 is a block diagram of apparatus for decoding digital video data in accordance with the present invention.

FIG. 10 is a block diagram of apparatus for decoding digital video data in accordance with the present invention. The decoding apparatus of FIG. 10 decodes data stored in DSM 10 having the data structure shown in FIG. 2. The decoding apparatus is comprised of a separation device 21, a video decoder 25 and an audio decoder 26. In response to control signals supplied from a controller 24, the encoded digital data is read from DSM 10 and supplied to a header separation circuit 22 which separates each pack header, each packet header and each entry packet from the read out data and supplies the separated data to controller 24. Header separation circuit 22 also supplies the time-divisionally multiplexed data to an input terminal G of a switching circuit 23 which demultiplexes the data (in response to a control signal from controller 24) by supplying video data therein to a terminal H1 and supplying audio data therein to a terminal H2. The video data is supplied to video decoder 25 and the audio data is supplied to audio decoder 26 which decode the respective data in manners well known in the art.

Controller 24 supplies the entry packet data to entry point storage device 24 which stores the supplied data therein. DSM 10 supplies to controller 24 readout position information identifying the position in the bit stream of that data supplied to header separation circuit 24.

The operation of the decoding apparatus of FIG. 10 operating in a search mode will now be described. A main controller (not shown) supplies appropriate control signals to controller 24, video decoder 25 and audio decoder 26 so that they operate in a particular search mode. Upon reproduction in the search mode, controller 24 controls DSM 10 to read out the closest I-frame identified by the data stored in device 41, if available. All of the entry points may be pre-stored (e.g., upon power-up) in device 41 (by reproducing the entire bit stream) prior to reproducing in the search mode. As previously discussed, an entry packet is located immediately before each I-frame and, thus, an I-frame is readably obtained.

DSM 10 reads out the I-frame including the entry packet that is stored immediately therebefore. Separation device 21 along with video decoder 25 operate to decode the I-frame and supply the decoded image data at the video output terminal. While the decoding apparatus is in the search mode, the output of audio decoder 26 is muted. While decoding the read out I-frame, controller 24 ascertains the position in DSM 10 of the next I-frame to be read out. As previously discussed, the entry packet includes therein the positions of 6 different I-frames relative to the position of the currently read out I-frame, and depending on which search mode is selected, the position of one of those 6 different I-frames is ascertained in controller 24.

Figure 11:
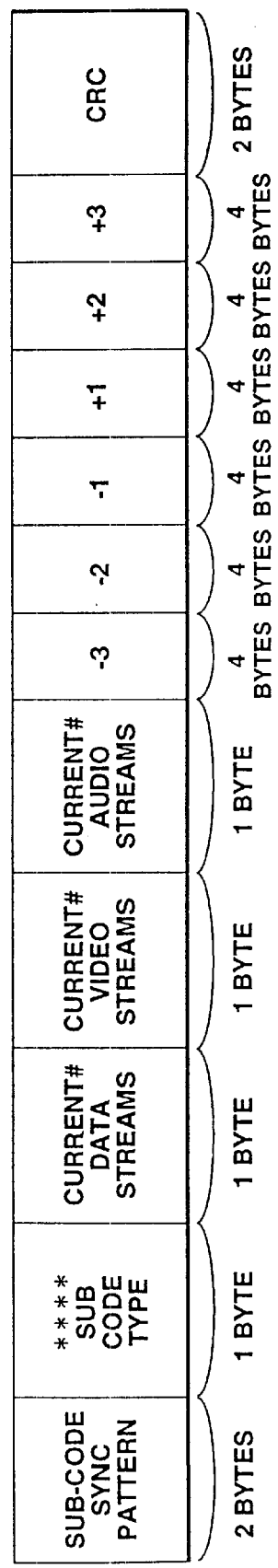
FIG. 11 illustrates the data structure of entry point data.

In a low speed forward search mode, the position of the next I-frame to be reproduced is stored in entry packet data +1. In a high speed forward search mode, the position of the next I-frame to be reproduced is stored in entry packet data +3. In addition, low, medium and high reverse search speeds can be accomplished since the position of the next I-frame to be reproduced is stored in entry packet data −1, −2, and −3, respectively. FIG. 11 illustrates the data structure of an entry packet reproduced from DSM 10 in accordance with another embodiment of the present invention.

Figure 12:
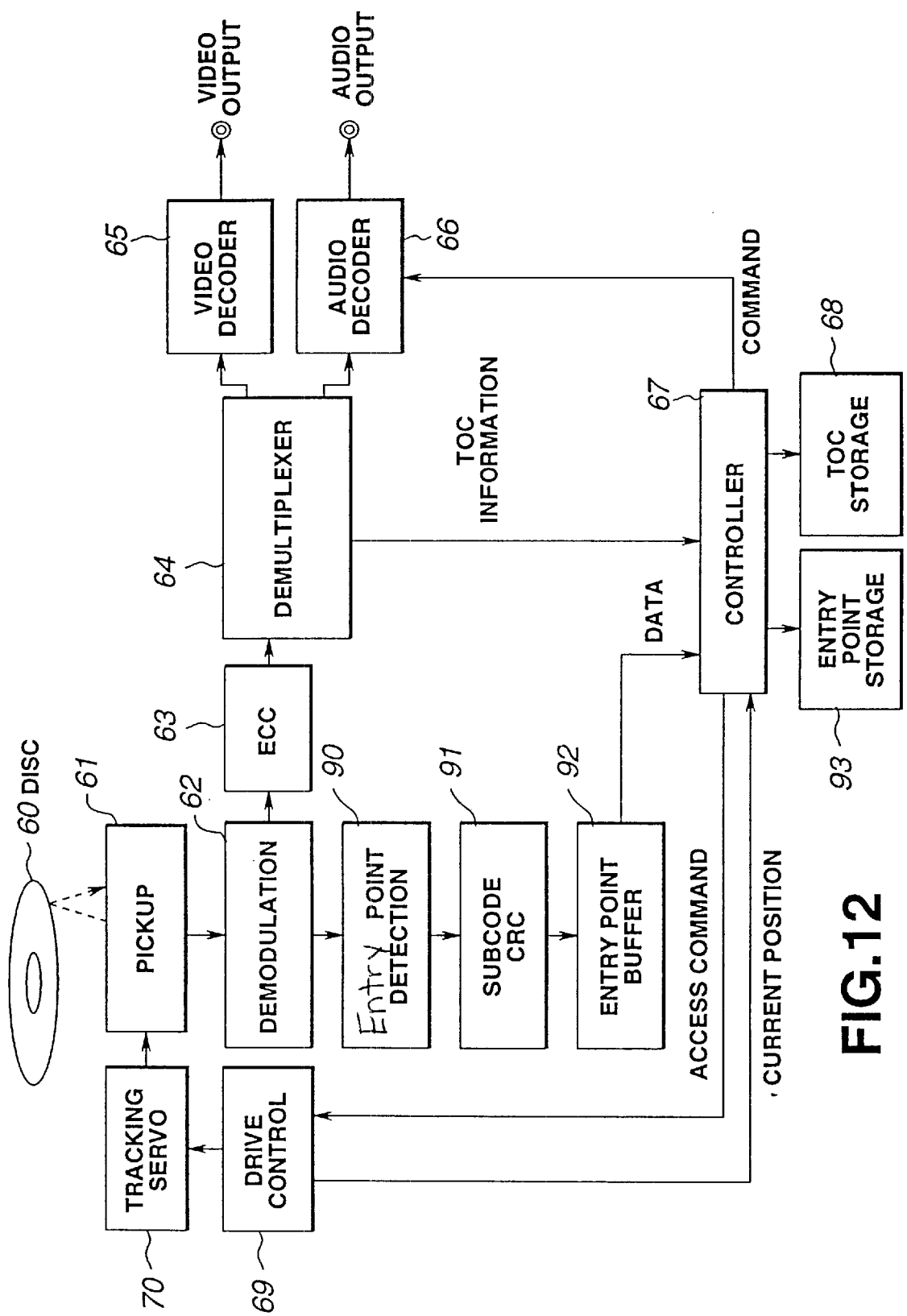
FIG. 12 is a block diagram of apparatus for decoding digital video data reproduced from a record medium in accordance with the present invention.

Referring next to FIG. 12, a block diagram of apparatus for decoding digital video data reproduced from an optical disk in accordance with another embodiment of the present invention is shown. Digital data is picked up from an optical disk 60 by pickup device 61 in response to a control signal supplied from a tracking servo device 70. A controller 67 supplies a control command to a drive control circuit 69 which produces a drive signal and which supplies the drive signal to tracking servo device 70. A data pack is read from the optical disk and supplied to demodulation circuit 62 which demodulates the signal and supplies a demodulated signal to ECC circuit 63 which detects and corrects errors in the supplied signal. The signal then is supplied to demultiplexer 64 which supplies video data therein to a video decoder 65, supplies audio data therein to an audio decoder 66 and supplies TOC information to controller 67. TOC information generally is stored in the first reproduced sector. Controller 67 supplies the TOC information to TOC storage device 68 which stores the TOC information therein. Further, controller 67 causes a display (not shown) to indicate to a user that the TOC data is loaded.

When the reproducing device shown in FIG. 12 begins reproducing video data (in response to an appropriate control signal), drive controller 69 drives via tracking servo circuit 70 the pickup device 61 to reproduce data from disk 60 at a position indicated by the user. At the same time, controller 67 controls video decoder 65 and audio decoder 66 to prepare for decoding.

Data is reproduced from disk 60 in a manner well known in the art and the reproduced data is demodulated in circuit 62 and supplied to ECC circuit 63 which corrects errors therein. The error corrected data is supplied to demultiplexer 64 which, as previously stated, demultiplexes the data and supplies the video and audio data therein to video and audio decoders 65 and 66 which decode and output the respectively supplied data.

In addition, demodulation circuit 62 supplies the demodulated reproduced data to an entry point detection circuit 90 which extracts entry point data (e.g., an entry packet) therefrom and supplies the extracted data to subcode CRC circuit 91 which corrects errors therein. The positions of the entry points of the I-frames identified in the entry point data are stored in entry point buffer 92.

Controller 67 reads out the data of the next entry point from the entry point buffer 92 and supplies the read-out information to an entry point storage device 93 which stores the data therein. Controller 92 is supplied with the information on the current read-out position from drive controller 69 and, thus, the position and contents of the next entry points can be associatively stored in device 93.

The operation of the reproducing and decoding apparatus of FIG. 12 operating in a search mode will now be described. Controller 67 controls video decoder 65 and audio decoder 66 so that they operate in a particular search mode. Upon reproduction in the search mode, controller 67 controls drive control 69 to cause pickup device 61 to read out the entry point that is located near the current read out position, as identified in device 93. Pickup device 61 reproduces data from the entry point and supplies via the various circuits the reproduced data to demultiplexer 64. Demultiplexer 64 supplies the video data to video decoder 65 which decodes and outputs the supplied data. While the reproducing and decoding apparatus of FIG. 12 is in the search mode, the output of audio decoder 66 is muted.

The entry point portions are separated from the data by entry point detection circuit 90 and stored in the entry point buffer 92 for retrieval by controller 67. As previously mentioned, since reproduction begins at the entry point, the ensuing video data is an I-frame which is quickly decoded and output.

As previously discussed, the entry packet includes therein the positions of 6 different I-frames relative to the position of the currently read out frame, and depending on the search mode, the position of one of the 6 I-frames is ascertained in controller 24. This operation is similar to that described above with reference to FIG. 10.

Figure 13:
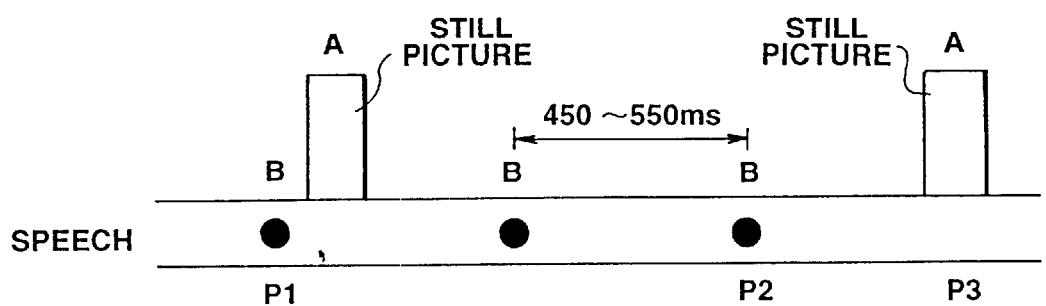
FIG. 13 is a schematic illustration showing the locations in a data stream of still image and audio data identified by entry point data in accordance with the present invention.

In the above discussed embodiments, both motion video and audio data are included in the bit stream. The present invention, however, is not limited to motion video and audio data and may involve a bit stream including still image and audio data or including only audio data. FIG. 13 is a schematic illustration showing the locations in a data stream of still image and audio data identified by entry point data in accordance with the present invention. Two different entry points A and B identify the locations of the beginning of still image data and audio data, respectively. An entry packet (A) is stored immediately prior to each still image, whereas an entry packet (B) is stored before predetermined temporal intervals of audio data in the bit stream. For example, entry sectors B are inserted in the bit stream representing audio intervals of time of 450 to 550 ms. Alternatively, if entry sectors A are present at an interval equal to the interval of entry sectors B, entry sectors B may be omitted.

Entry sector A has program stream directory data composed of three entries which specify an immediately previous still image, an immediately succeeding still image and the next succeeding still image, respectively. If the immediately previous still image and the next following still image are not present, zeros are recorded in the program stream directory data. The immediately succeeding still image cannot be absent, so that an offset is necessarily recorded. On the other hand, the entry sector B has program stream directory data made up of two entries which denote the directly previous still image and the next following still image.

The above-discussed embodiment, wherein audio still image and audio data are transmitted in a bit stream, may be encoded by the encoding apparatus shown in FIG. 1, previously discussed. However, each still image in this embodiment is treated as an I-frame in the apparatus of FIG. 1.

Referring back to FIG. 1, controller 8 receives an entry point generating signal from video encoder 1 or from video entry point detection circuit 31 and causes an entry sector A of the type corresponding to the still image to be generated and stored directly ahead of the still image in the bit stream.

If 450 to 550 milliseconds have elapsed without the generation of an entry point by generating sector 32, an entry sector B that is not associated with a still image is generated and multiplexed onto the bit stream. The number of entries contained in the program stream directory data at this time becomes different.

Entry sector A includes therein the positions of three entry sectors immediately preceding data of 3 still images, respectively. The positions correspond to a preceding still image to the current image and the two succeeding still images. However, entry sector A of the type not corresponding to the still image include the positions of two entry sectors that precede 2 still images, one still image being before the current image and one still image being after the current image. This data is stored as the program stream directory data.

Similar to the positions of I-frames, previously discussed, the position of preceding entry sector positions are known and, thus, can be stored in storage device 33. However, the following entry sector positions are known. Thus, all entry point positions are stored in storage device 33 and after the entire bit stream is stored in DSM 10, the positions of the entry sectors of the next entry points directly previous and directly subsequent to each entry sector are read out and supplied to the DSM 10 for recording thereon.

Since relatively few still images are recorded on a record medium, it is necessary for a reproducing apparatus to be able to readily identify the locations at which the images are recorded. For example, if reproduction begins at position P2 of FIG. 13, and the associated video image for the audio data stored at P2 is at position P1, it is necessary for the reproducing apparatus to access position P1 so as to read out the still image data and then return to position P2 to reproduce the audio data.

At this time, the reproducing apparatus is operated in such a manner that it searches the closest entry sector from a position designated for starting the reproduction. The entry sector begins with a pack header followed directly by program stream directory data, as shown in FIG. 6. The reproducing apparatus inspects the data contents from the position designated for reproduction and when a coincidence of the entry sector features is noticed, it causes the contents of the entry sector to be read out. The reproducing apparatus then comes to a halt.

If there are three PSD entries, there is a still image directly at back, so that reproduction is continued. If there are two PSD entries, the associated still image is present in the past, so that it is necessary to read and decode the associated still image. The reproducing apparatus accesses using the directly previous still image from the read-out PSD. In the example of FIG. 13, the reproducing apparatus jumps from position P2 to position P1. The reproducing apparatus reads out, decodes and stores the corresponding still image before reverting back to the position P2 for starting the audio decoding. In this manner, correctly associated reproduction may be achieved in a stream containing both still image and audio data.

Special reproduction on the still image is accomplished by utilizing the positions of previous still images and subsequent still images recorded in each entry sector. That is, in a special forward reproduction mode, the reproducing apparatus jumps to the position of the directly succeeding still image identified as the PSD data that is recorded in each entry sector. In a special reverse reproduction mode, the apparatus jumps to the position of the directly previous still image.

Figure 14:
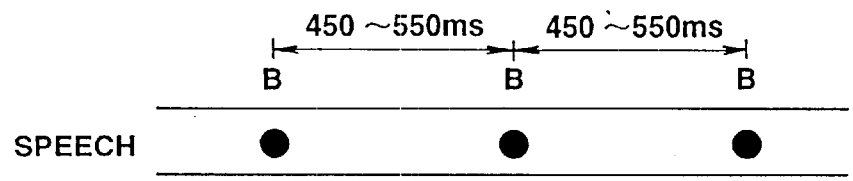
FIG. 14 is another schematic illustration showing the locations of audio data identified by entry point data in accordance with another embodiment of the present.

FIG. 14 schematically illustrates a bit stream including only audio data. Audio entry sectors B are stored at intervals of 450 to 550 milliseconds in the audio data stream. The entry sector includes program stream directory data, but no video data is specified therein. Thus, the presence of program stream directory data specifies only the fact that the sector is an entry sector. Playback start enabling points are present substantially every sector. Thus, there is no meaning in recording the entry points and, hence, there is no PSD entry. However, the information of program stream map data is required for comprehending the stream status. Therefore, reproduction begins in general at an entry sector and reproduction begins after acquiring the information on program stream map data.

While the present invention has been particularly shown and described in conjunction with preferred embodiments thereof, it will be readily appreciated by those of ordinary skill in the art that various changes may be made without departing from the spirit and scope of the invention. For example, although the time intervals of 1, 2 and 4 seconds, and 1, 3 and 9 seconds is disclosed herein, other time intervals and other number of time intervals, e.g., 4 different time intervals may be used in the present invention.

Therefore, it is intended that the appended claims be interpreted as including the embodiments described herein, the alternatives mentioned above, and all equivalents thereto.

What is claimed is:

1. Apparatus for encoding digital still image and audio data, comprising:

means for variable rate encoding the digital still image and audio data to produce variable rate encoded data including encoded still images;

means for identifying entry points representing locations of the still images in said encoded data;

means for identifying audio entry points representing locations within said audio data;

means for generating entry point data identifying positions of the identified entry points in said encoded data;

means for adding the entry point data to said encoded data; and means for recording the encoded data having the generated entry point data added thereto on a record medium;

whereby said entry point data includes two types of entry sectors, a first type of entry sector which is coincident with each encoded still image, and a second type of entry sector which is located periodically with respect to said audio data, said first type of entry sector including directory data indicative of three still images, an immediately previous still image, an immediately succeeding still image and a next succeeding still image, and said second type of entry sector including data indicative of two images, a previous still image and a next still image.

2. The apparatus according to claim 1, wherein said entry points are indicative of the relative distances between the occurrence of successive still images corresponding to said entry points.

3. Method of encoding digital still image and audio data, comprising the steps of:

variable rate encoding the digital still image and audio data to produce variable rate encoded data including encoded still images;

identifying entry points representing locations of the still images in said encoded data;

identifying audio entry points representing locations within said audio data;

generating entry point data identifying positions of the identified entry points in the encoded data;

adding the entry point data to said encoded data; and recording the encoded data having the generated entry point data added thereto on a record medium;

whereby said entry point data includes two types of entry sectors, a first type of entry sector which is coincident with each encoded still image, and a second type of entry sector which is located periodically with respect to said audio data, said first type of entry sector including directory data indicative of three still images, an immediately previous still image, an immediately succeeding still image and a next succeeding still image, and said second type of entry sector including data indicative of two images, a previous still image and a next still image.

4. The method according to claim 3, wherein said entry points are indicative of the relative distances between the occurrence of successive still images corresponding to said entry points.

5. Apparatus for decoding variable rate encoded digital still image data and audio data, comprising:

reproducing means for reproducing from a record medium variable rate encoded still images and audio data, said encoded still images and audio data including entry point data identifying entry points of the encoded data representing respective locations of still images in the encoded data;

means for extracting the entry point data from the reproduced encoded data;

storage means for storing the extracted entry point data;

control means for controlling said reproducing means to reproduce an encoded still image and encoded audio data in accordance with entry point data stored in the storage means; and means for variable rate decoding the reproduced encoded still image and encoded audio data to produce a decoded still image and decoded audio data;

whereby said entry point data includes two types of entry sectors, a first type of entry sector which is coincident with each encoded still image, and a second type of entry sector which is located periodically with respect to said audio data, said first type of entry sector including directory data indicative of three still images, an immediately previous still image, an immediately succeeding still image and a next succeeding still image, and said second type of entry sector including data indicative of two images, a previous still image and a next still image.

6. The apparatus according to claim 5, wherein said entry points are indicative of the relative distances between the occurrence of successive still images corresponding to said entry points.

7. Method of decoding variable rate encoded digital still image data and audio data, comprising the steps of:

reproducing from a record medium variable rate encoded still images and audio data, said encoded still images and audio data including entry point data identifying entry points of the encoded data representing respective locations of still images in the encoded data;

extracting the entry point data from the reproduced encoded data;

storing the extracted entry point data in a memory;

controlling the reproducing of the encoded data in accordance with entry point data stored in the memory to reproduce an encoded still image and encoded audio data; and variable rate decoding the reproduced encoded still image and encoded audio data to produce a decoded still image and decoded audio data;

whereby said entry point data includes two types of entry sectors, a first type of entry sector which is coincident with each encoded still image, and a second type of entry sector which is located periodically with respect to said audio data, said first type of entry sector including directory data indicative of three still images, an immediately previous still image, an immediately succeeding still image and a next succeeding still image, and said second type of entry sector including data indicative of two images, a previous still image and a next still image.

8. The method according to claim 7, wherein said entry points are indicative of the relative distances between the occurrence of successive still images corresponding to said entry points.

9. Apparatus for encoding digital audio data, comprising:

means for encoding the digital audio data to produce encoded data in the form of audio data units;

means for identifying audio entry points representing locations within said digital audio data;

means for generating entry point data identifying positions of the identified entry points in said encoded data;

means for adding the entry point data to each of one or more of said audio data units; and means for recording the encoded data having the generated entry point data added thereto on the record medium;

whereby said entry point data added to each of one or more of said audio data units includes an entry sector indicative of two images, a previous still image and a next still image.

10. Method of encoding digital audio data, comprising the steps of:

encoding the digital audio data to produce encoded data in the form of audio data units;

identifying audio entry points representing locations within said digital audio data;

generating entry point data identifying positions of the identified entry points in the encoded data;

adding the entry point data to each of one or more of said audio data units; and recording the encoded data having the generated entry point data added thereto on the record medium;

whereby said entry point data added to each of one or more of said audio data units includes an entry sector indicative of two images, a previous still image and a next still image.

11. Apparatus for decoding encoded digital audio data, comprising:

reproducing means for reproducing from a record medium encoded digital audio data, said encoded digital audio data being made up of a plurality of audio data units, and one or more of said audio data units including audio entry point data;

means for extracting the entry point data from the reproduced encoded digital audio data;

storage means for storing the extracted entry point data;

control means for controlling said reproducing means to reproduce said encoded digital audio data in accordance with entry point data stored in the storage means; and means for decoding the reproduced encoded digital audio data to produce decoded audio data;

whereby said audio entry point data includes an entry sector indicative of two images, a previous still image and a next still image.

12. Method of decoding encoded digital audio data, comprising the steps of:

reproducing from a record medium encoded digital audio data, said encoded digital audio data being made up of a plurality of audio data units, and one or more of said audio data units including audio entry point data;

extracting the entry point data from the reproduced encoded digital audio data;

storing the extracted entry point data in a memory;

controlling the reproducing of the encoded digital audio data in accordance with entry point data stored in the memory to reproduce encoded digital audio data; and variable rate decoding the reproduced encoded digital audio data to produce a decoded audio data;

whereby said audio entry point data includes an entry sector indicative of two images, a previous still image and a next still image.

* * * * *